United States Patent
Krisher et al.

(10) Patent No.: US 6,336,537 B1
(45) Date of Patent: Jan. 8, 2002

(54) WHEEL END WITH BI-DIRECTIONAL OVERRUNNING CLUTCH

(75) Inventors: James A. Krisher, Ft. Wayne; Richard Krupp, Auburn, both of IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/464,617

(22) Filed: Dec. 16, 1999

(51) Int. Cl.$^7$ ............................................... B60K 17/30
(52) U.S. Cl. ......................... 192/43; 192/50; 192/69.4
(58) Field of Search ............................. 192/43, 49, 50, 192/69.4; 180/245, 247, 233

(56) References Cited

U.S. PATENT DOCUMENTS

| | | | |
|---|---|---|---|
| 4,213,514 A | | 7/1980 | Ehrlinger et al. |
| 4,282,949 A | * | 8/1981 | Kopich et al. ............... 180/252 |
| 4,433,766 A | | 2/1984 | Teraoka |
| 4,627,512 A | | 12/1986 | Clohessy |
| 4,817,752 A | | 4/1989 | Lobo et al. |
| 4,960,192 A | * | 10/1990 | Kurihara ................... 192/67 R |
| 5,036,939 A | | 8/1991 | Johnson et al |
| 5,085,304 A | * | 2/1992 | Barroso ..................... 192/67 R |
| 5,123,513 A | | 6/1992 | Petrak |
| 5,141,088 A | | 8/1992 | Kurihara et al. |
| 5,148,901 A | * | 9/1992 | Kurihara et al. .......... 192/67 R |
| 5,219,054 A | * | 6/1993 | Teraoka ..................... 192/67 R |
| 5,353,890 A | | 10/1994 | Clohessy |
| 5,740,895 A | | 4/1998 | Bigley |
| 5,967,279 A | * | 10/1999 | Itoh et al. ................. 192/69.41 |

* cited by examiner

*Primary Examiner*—Charles A Marmor
*Assistant Examiner*—Saúl Rodriguez
(74) *Attorney, Agent, or Firm*—Oldham & Oldham Co., L.P.A.

(57) ABSTRACT

An integrated wheel end assembly for a vehicle including a wheel hub, a stub shaft, a torque flange and a bi-directional overrunning clutch member is configured such that the clutch automatically acts as a hub lock. The wheel hub is drivingly engaged to a drive flange mounted at an inboard end thereof. An outer circumference of the drive flange has a plurality of external teeth spaced evenly therearound. An outboard end of the stub shaft is rotatingly supported in the wheel hub and an inboard end thereof defines a housing for a CV joint. This CV housing and the drive flange are positioned axially adjacent to each other. The bi-directional overrunning clutch member comprises two clutch plates, one drivingly connected to the CV housing and the other drivingly connected to the drive flange. In a first configuration the clutch plates are disengaged such that the rotating CV housing causes only the corresponding clutch plate to rotate and no drive torque is transferred from the half shaft to the wheel hub. In a second configuration the clutch plates are engaged so as to co-rotate and drive torque is transferred from the half shaft to the wheel hub through the engagement. The clutch utilizes its overrunning feature to disengage the clutch plates when the wheel is rotating faster that the drive shaft and automatically engages when the rotational speed of the wheel equals that of the drive shaft.

14 Claims, 2 Drawing Sheets

WHEEL END WITH BI-DIRECTIONAL OVERRUNNING CLUTCH

The present invention relates to a vehicle wheel end having a bi-directional overrunning clutch, and particularly a wheel end having a bi-directional overrunning clutch functioning as a hublock.

BACKGROUND OF THE INVENTION

Some four-wheel vehicles are capable of being selectively switched from a condition of two-wheel drive (often referred to as "4×2") to a condition of four-wheel drive (often referred to as "4×4"). Such a vehicle requires that one of the axles comprise a set of half shafts in which a hub is locked to the half shaft and receiving drive torque part of the time, but the hub may be rotationally disengaged from the half shaft at other times, during which the hubs are able to freewheel. This prevents drag and wear due to forced rotation of the drive train as a result of the front wheels being driven as the vehicle is propelled.

In a vehicle having two axles with four wheels, only one of the axles will be provided with steerable wheels. This axle is usually the axle which receives drive torque on a selective basis, the non-steerable axle normally being provided with full-time drive torque. While the technical requirements for a non-steerable, full-time-drive axle are among the least complex of the possible configurations, the combination of steerability in a selective drive axle provides a great amount of technical challenge. For that reason, among others, it is highly desirable to be able to combine and simplify structures to the fullest extent possible.

There are several devices shown in the prior art disclosing mechanisms for rotationally engaging and disengaging a hub. Many of these devices disclose locking hub clutch systems that require external actuation or control using electrical wiring, vacuum hoses, etc. One type of such a device uses a separate vacuum or pressure chamber located at the outer end of the wheel hub. The problem with these devices is that they must be attached or integrated into areas where there is little room. This may result in many other problems, from loss of control due to failure of the control mechanism, to aesthetics such as unsightly protrusions extending from the center of the wheel. One prior art device discloses a hub locking clutch device in which the locking actuator piston operates in a machined cylinder within the axle stub shaft and the axle joint yoke. In this device the cylinder and the locking actuator piston are an integral part of the axle shaft. While this device does not require attachment of a separate vacuum or pressure chamber, like the wheel end devices, the space available in the axle provides a relatively small diameter available for transmitting torque between its elements, resulting in higher stresses on its members.

In yet another device, the hub locking actuator is a hydraulically actuated ring and diaphragm which is attached to the knuckle. While this device has a much larger diameter available for transferring torque than the previous devices, it still requires the addition of a separate pressure chamber.

It is therefore an advantage of the present invention to provide a simplified version of a hub locking device.

SUMMARY OF THE INVENTION

This advantage of the present invention is achieved by an integrated wheel end assembly for a vehicle comprising a knuckle coupled to the vehicle, a bearing assembly mounted to the knuckle, a cylindrical wheel hub mounted on the bearing assembly, a stub shaft, and a bi-directional overrunning clutch member. In a preferred configuration, the wheel end assembly receives drive torque from a half shaft through a constant velocity joint. The bearing assembly allows for relatively free rotation of the wheel hub about a central axis thereof. The wheel hub has a flange for mounting the wheel at an outboard end thereof and a drive flange at an inboard end thereof. An outer circumference of the drive flange has a plurality of external teeth spaced evenly therearound. An outboard end of the stub shaft is rotatingly supported in the wheel hub and an inboard end thereof defines a housing for the CV joint. This housing has a plurality of external teeth. The housing and flange are positioned axially adjacent to each other. The bi-directional overrunning clutch member comprises two clutch plates, each having a set of internal teeth, one sized and adapted for engaging the external teeth on the housing and the other set sized and adapted for engaging the external teeth on the drive flange. In a first configuration the clutch plates are disengaged such that the rotating CV housing teeth cause only the corresponding clutch plate to rotate and no drive torque is transferred from the half shaft to the wheel hub. In a second configuration the clutch plates are engaged so as to rotate with one another and the clutch plate teeth engage both the CV housing teeth and drive flange teeth, such that drive torque is transferred from the half shaft to the wheel hub through the engagement.

It is therefore an advantage of the present invention to provide a simplified version of a hub lock assembly where the hub lock feature is automatically provided by a wheel end incorporating a bidirectional overrunning clutch. This results in less parts as well as added protection for the interior wheel elements.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PREFERRED EMBODIMENT

Figure 1:
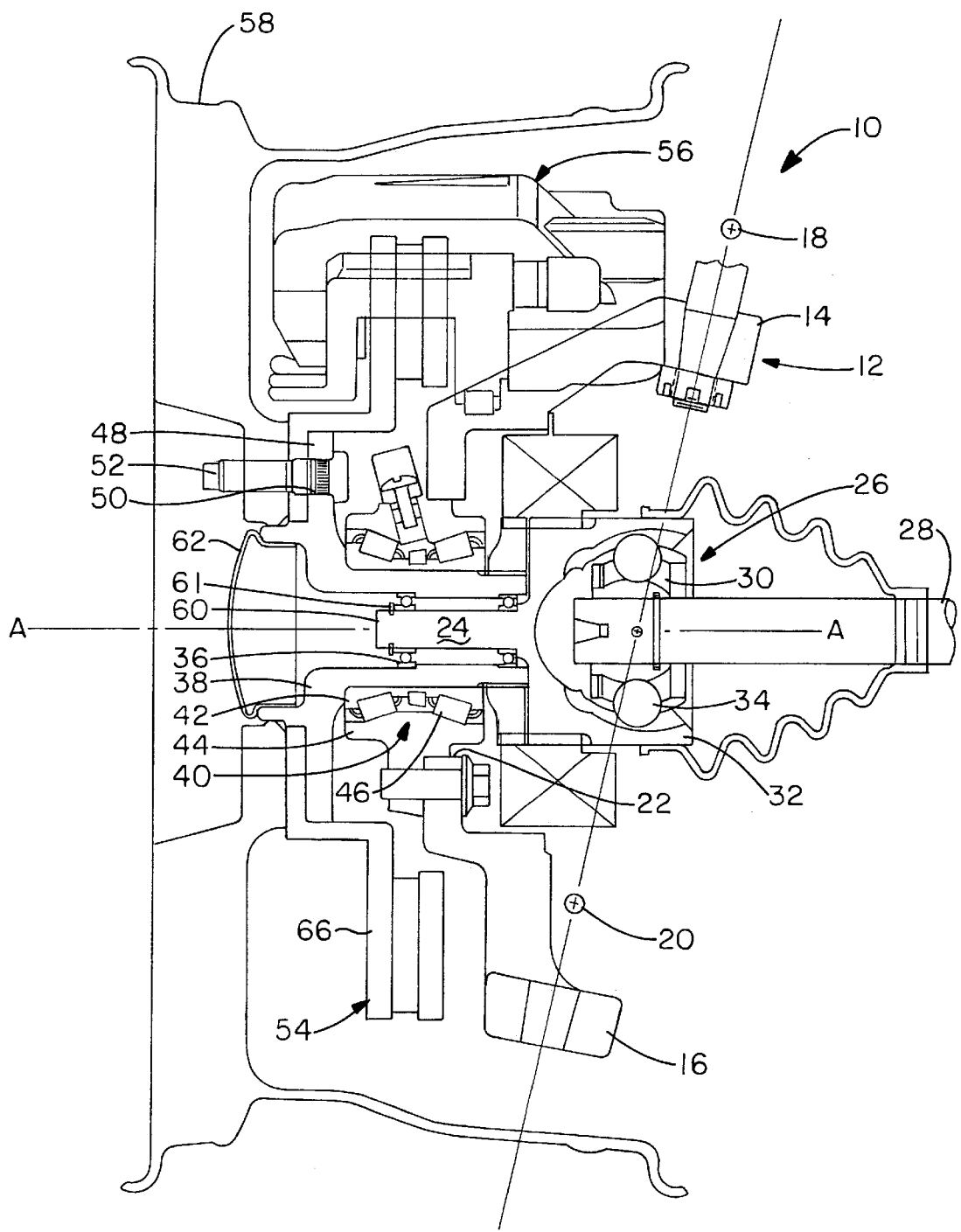
FIG. 1 shows a sectional view of the axle end assembly according to the invention.

An axle end assembly 10 incorporating the present invention is shown in side sectional view in FIG. 1. It is important to note immediately that there is a general axis of symmetry provided by a centerline A of the assembly. Many of the structures shown above the centerline A will be reflected in a mirror-image fashion below the centerline.

The assembly 10 has a variety of depicted elements which are generally known and understood and which provide benchmarks for identifying the specific area of the vehicle where the invention will be found. In the axle end assembly 10, the steering knuckle 12 is shown with an upper and a lower mounting boss 14, 16, respectively. These provide pivotal attachment for the knuckle 12 to the frame (not shown) of the vehicle, via upper and lower ball joints (not shown), which would be centered on points indicated as 18, 20, respectively, if they were fully depicted. Although somewhat difficult to discern with all of the other details being shown, the knuckle 12 also includes a central bore 22, with its axis indicated by centerline A. Internal to this bore is a stub shaft 24 of a constant velocity (CV) joint, shown generally as 26. The right side of FIG. 1 is the "inboard" side of the assembly and the left side is the "outboard" side. Drive torque to power this wheel assembly 10 originates at an inboard end of the half shaft 28, which is driven by a torque source (not shown), typically a differential. The outboard end of the half shaft 28 terminates in a linkage with the inboard end of the stub shaft 24 inside the CV joint 26. The half shaft 28 terminates in an inner race 30 with the stub shaft 24 terminating in an outer race 32. The inner and outer races 30, 32 being linked in the specific embodiment shown by a plurality of balls 34. The portion of the stub shaft 24 received inside a wheel hub 38 is supported therein on one or more bearings 36. An annular bearing assembly 40 is affixed to the outboard side of the knuckle 12 and supports the wheel hub in the bore 22. This bearing assembly 40 has an inner race 42 which is journaled onto the axial length of wheel hub 38 toward the inboard end of the hub and an outer race 44. Between the inner and outer races 42, 44, a plurality of roller means, such as taper rollers 46, allow rotation of the inner race inside the outer race.

A radially extending flange 48 on the outboard side of the wheel hub 38 has a plurality of bores 50 equally spaced around the flange. These bores 50 receive stud bolts 52 which face axially outboard. The stud bolts 52 may be used (with lugnuts which are not shown) to mount a brake rotor 54 to the wheel hub 38. This brake rotor 54 interacts with a caliper type brake assembly 56 which is non-rotatably attached to the knuckle 12. This brake assembly allows brake pads (not shown) to be compressed against an outer flange portion 66 of the brake rotor 54 to provide braking to the wheel end assembly 10. Outboard from the brake rotor 54, the same stud bolts 52 are used to mount a wheel rim 58 to the wheel hub 38. The mounting of a tire (not shown) on the wheel rim 58 is well known and is not illustrated. An outer portion of the wheel rim 58 provides a seat for mounting a tire.

The outboard end 60 of the stub shaft 24 will typically be adapted to receive a device for locking the wheel hub 38 onto the stub shaft 24. In FIG. 1, a snap ring 61 is shown as the locking device. This snap ring 61 acts as an additional safety feature to prevent the wheel from separating from the wheel end if the hub or hub retaining ring (not shown) were to fail. The outboard end 60 may also be provided with a transverse bore (not shown) for receiving a cofter pin (not shown) or the like. A cap 62 is often provided to cover the outboard end of the wheel hub 38 and to protect the bore in the wheel hub and its internal contents.

Figure 2:
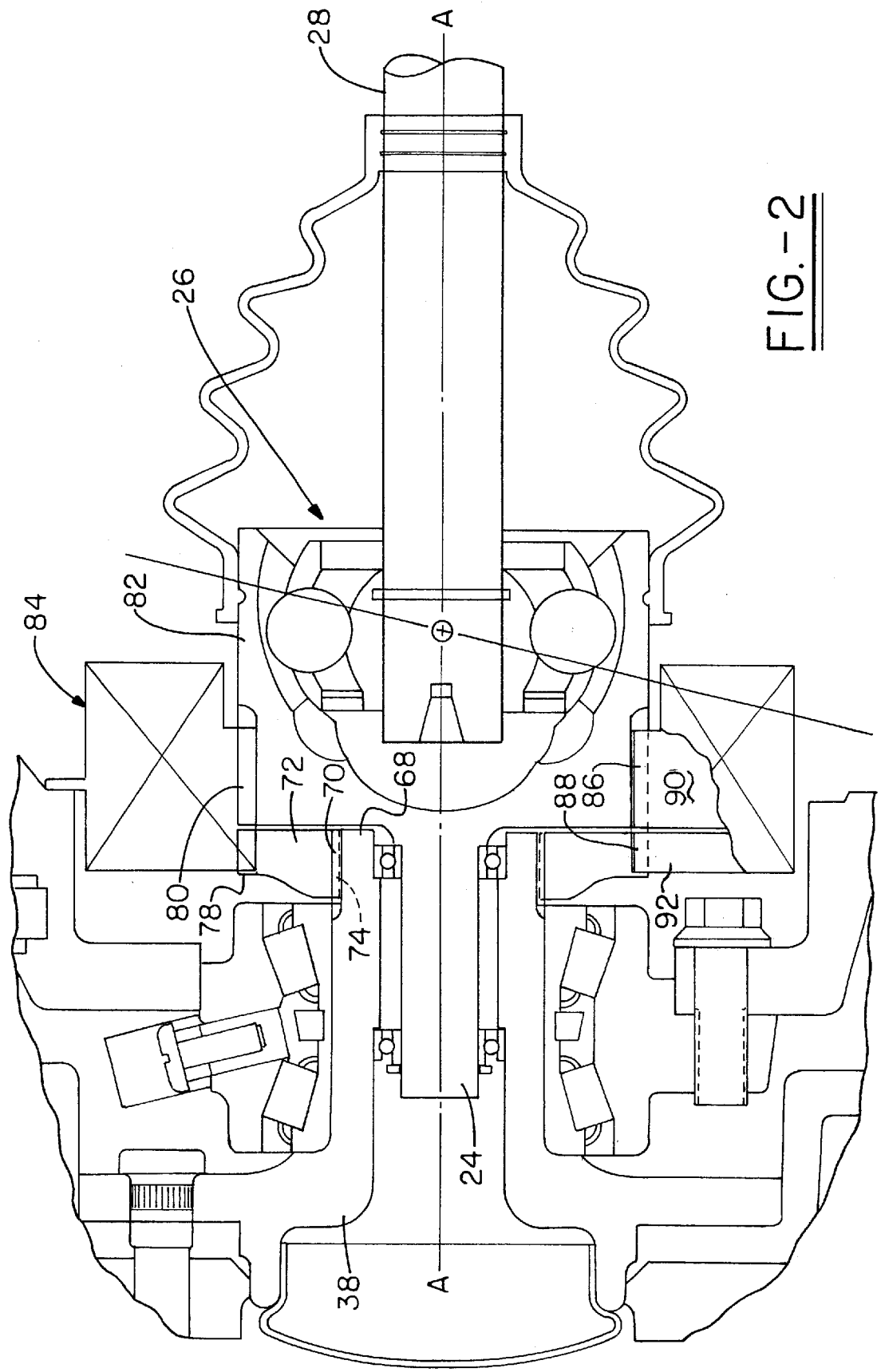
FIG. 2 shows an enlarged portion of the assembly of FIG. 1.

Turning now to FIG. 2, the inboard end 68 of the wheel hub 38 has external splines 70 formed in the outer circumference thereof. A demountable flange 72 has a set of mating internal splines 74 formed on the inner bore thereof. Flange 72 rotates with wheel hub 38, and is selectively able to transmit driving torque from the half shaft 28 to the wheel hub, as will be described below. Alternatively, the flange 72 could be made integrally with hub 38 if desired. Flange 72 also has an outer circumference with a plurality of external teeth 78 spaced evenly therearound. A corresponding plurality of external teeth 80 are positioned on the outboard side of the housing 82 of the CV joint 26, axially adjacent to teeth 78. A bi-directional overrunning clutch 84 comprises at least two clutch plates 90 and 92 each having a plurality of internal teeth 86, 88 respectively, cut into its inner bore. The internal teeth 86 of at least one inboard clutch plate 90 engages the teeth 80 on the housing 82 while the internal teeth 88 of at least one outboard clutch plate 92 engages the teeth 78 of the flange 72. The inboard clutch plate 90 co-rotates with the CV joint housing 82. The bidirectional overrunning clutch 84 comprises elements (not shown) which lock and unlock the clutch plates 90, 92. When the plates 90, 92 are locked together, this produces a driving connection between the half shaft 28 and the wheel hub 38 to drive the wheel 58. When the plates 90, 92 are disengaged, the outboard clutch plate 92 does not rotate with the inboard clutch plate 90 and no driving connection is formed between the half shaft 28 and the wheel hub 38. The overrunning clutch 84 may be of any known configuration, and in general operates automatically in that in that the clutch plates 90, 92 are engaged providing torque to the wheel until an overrunning condition is encountered. In an overrunning condition, where the wheel is rotating faster than the drive shaft, the clutch plates 90, 92 will disengage until the speeds equalize. The wheel will be able to freely rotate until the wheel speed equals the drive shaft rotational speed, at which point the clutch will automatically re-engage to provide driving torque to the wheel. The clutch is thus able to operate as an automatic hub lock. The clutch 84 is bi-directional such that it can operate in both clockwise and counter-clockwise directions.

Further, the clutch 84 is positioned and configured such that it encloses the interior of the wheel hub thus protecting the wheel bearing and seal from contamination such as dirt, dust and water.

The wheel end 10 is designed for commonalty such that the design can be used in 4×4, 4×2 and AWD. Specifically the knuckle, wheel bearing, brake rotor, brake caliper, hubcap, and wheel could be used by all three designs.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. An integrated wheel end system for providing driving engagement/disengagement of a wheel to convert between driven and non-driven modes, said system comprising,
   a knuckle;
   a bearing assembly mounted to said knuckle;
   a wheel hub mounted on the bearing assembly for rotation with respect to said knuckle, said hub adapted to have a wheel mounted thereon, and having an inner portion having splines formed on the outer circumference thereof,
   a drive shaft mounted in association with said hub through bearings, said shaft comprising a constant velocity joint housing at its inner end attached to a source of driving torque through a constant velocity joint, said housing having splines formed on its outer circumference, and
   a bi-directional overrunning clutch having at least one first clutch plate engaged with said splines formed on said constant velocity joint housing and at least one second clutch plate engaged with said splines formed on said wheel hub, wherein operation of said clutch selectively locks said at least one first and second clutch plate together to provide an engaged and disengaged position, wherein said engaged position provides a driving connection between said hub and said constant velocity joint housing and said disengaged position in which no driving connection is produced permitting the hub to rotate freely.

2. The wheel end system of claim 1, wherein said clutch is a bidirectional overrunning clutch which automatically disengages when said hub rotation speed exceeds the speed of said source of driving torque.

3. The wheel end system of claim 1, wherein said clutch is a bidirectional overrunning clutch which automatically engages when said wheel rotation speed is less than or equal to the speed of said source of driving torque.

4. The wheel end system of claim 1, wherein said clutch is mounted to protect said wheel bearings from contamination.

5. The wheel end system of claim 1, wherein said knuckle, wheel bearing, brake rotor, brake caliper, hubcap, and wheel are designed to be used as common components in 4×2, 4×4 or all wheel drive drive train systems.

6. The wheel end system of claim 1, wherein said splines associated with said wheel hub are formed on a demountable flange member coupled to said wheel hub.

7. The wheel end system of claim 1, wherein said splines associated with said wheel hub and said housing are located adjacent one another.

8. The wheel end system of claim 1, wherein said source of driving torque is a differential operatively coupled to a drive shaft and transmitting drive torque to a half shaft coupled to transmit torque through said CV joint to a stub shaft associated with said housing.

9. An integrated wheel end system for providing driving engagement/disengagement of a wheel to convert between driven and non-driven modes, said system comprising,
   a wheel hub,
   a flange having splines on an inner diameter surface thereof matingly engaging splines on an outer circumferential surface of said wheel hub in a manner such that a driving torque can be transmitted from said flange to said wheel hub,
   a stub shaft comprising a constant velocity joint housing at its inner end attached to a drive shaft through said constant velocity joint, said housing positioned adjacent to said flange, and
   a clutch having an engaged and disengaged position, wherein said engaged position provides a driving connection between said flange and said constant velocity joint housing, and wherein said disengaged position produces no driving connection permitting said constant velocity joint housing to rotate freely of the demountable flange.

10. The wheel end system of claim 9, wherein said clutch is a bidirectional overrunning clutch which automatically disengages when said wheel hub rotation speed exceeds the drive shaft speed.

11. The wheel end system of claim 9, wherein said clutch is a bidirectional overrunning clutch which automatically engages when said wheel hub rotation speed is less than or equal to the drive shaft speed.

12. The wheel end system of claim 9, wherein said clutch protects the interior wheel hub from contamination.

13. An integrated wheel end system for providing driving engagement/disengagement of a wheel to convert between driven and non-driven modes, said system comprising,
   a knuckle;
   a bearing assembly mounted to the knuckle support;
   a wheel hub mounted on the bearing assembly for rotation with respect to said knuckle, said hub adapted to have a wheel mounted thereon, and having an inner portion having splines formed on the outer circumference thereof;
   a drive shaft mounted in association with said hub through bearings, said shaft comprising a constant velocity joint housing at its inner end attached to a source of driving torque through said constant velocity joint, said housing having splines formed on its outer circumference; and
   a bi-directional overrunning clutch engaged with said splines formed on said constant velocity joint housing and engaged with said splines formed on said wheel hub, wherein operation of said clutch selectively provides an engaged and disengaged position, wherein said engaged position provides a driving connection between said hub and said constant velocity joint housing and said disengaged position in which no driving connection is produced permitting the hub to rotate freely.

14. The wheel end system of claim 13, wherein said splines associated with said wheel hub are formed on a demountable flange member coupled to said wheel hub.

* * * * *